United States Patent
Watt et al.

(10) Patent No.: US 8,404,396 B2
(45) Date of Patent: Mar. 26, 2013

(54) FUEL CELL AND METHOD FOR GENERATING ELECTRIC POWER

(75) Inventors: Gerald Watt, Provo, UT (US); Dean R. Wheeler, Orem, UT (US)

(73) Assignee: Brigham Young University, Provo, UT (US)

( * ) Notice: Subject to any disclaimer, the term of this patent is extended or adjusted under 35 U.S.C. 154(b) by 575 days.

(21) Appl. No.: 12/600,340

(22) PCT Filed: May 14, 2008

(86) PCT No.: PCT/US2008/006155
§ 371 (c)(1),
(2), (4) Date: Nov. 16, 2009

(87) PCT Pub. No.: WO2008/143877
PCT Pub. Date: Nov. 27, 2008

(65) Prior Publication Data
US 2010/0151356 A1    Jun. 17, 2010

Related U.S. Application Data

(60) Provisional application No. 60/917,866, filed on May 14, 2007.

(51) Int. Cl.
*H01M 8/08* (2006.01)
*H01M 8/22* (2006.01)
(52) U.S. Cl. .................... 429/505; 429/506; 429/531
(58) Field of Classification Search .................. 429/505, 429/506, 531
See application file for complete search history.

(56) References Cited

U.S. PATENT DOCUMENTS

| | | | |
|---|---|---|---|
| 2,343,194 A | 11/1940 | Lawson | |
| 4,117,202 A | 9/1978 | Beck | |
| 4,144,143 A * | 3/1979 | Hawkridge et al. | 205/317 |
| 4,294,891 A | 10/1981 | Yao et al. | |
| 4,318,968 A | 3/1982 | Berger et al. | |
| 4,348,465 A | 9/1982 | Struthers | |
| 4,484,992 A | 11/1984 | Bühler et al. | |
| 5,179,467 A | 1/1993 | Buchwalter et al. | |
| 5,563,273 A | 10/1996 | Buchwalter et al. | |
| 5,660,940 A | 8/1997 | Larsson et al. | |
| 5,976,719 A | 11/1999 | Kim et al. | |
| 6,154,306 A | 11/2000 | Varaprasad et al. | |
| 6,355,369 B1 | 3/2002 | Iarochenko et al. | |
| 6,372,371 B1 | 4/2002 | Iarochenko et al. | |
| 6,407,330 B1 | 6/2002 | Lindsey et al. | |

(Continued)

FOREIGN PATENT DOCUMENTS
EP  1 556 916 B1  7/2005
WO  WO 2008/143877 A1  11/2008

OTHER PUBLICATIONS

He, Q., et al., "Novel Electrocatalysts for Direct Oxidation of Alcohols in High pH Environments," Meet. Abstr.—Electrochem. Soc. 702, 553 (2007), retrieved from http://www.electrochem.org/meetings/scheduler/abstracts/212/0553.pdf.

(Continued)

*Primary Examiner* — Yogendra Gupta
*Assistant Examiner* — Alison Hindenlang
(74) *Attorney, Agent, or Firm* — Brinks Hofer Gilson & Lione; Ryan L. Marshall (57) ABSTRACT

A non-microbial fuel cell utilizing an organic fuel containing a hydroxyl group and a non-metallic catalyst is disclosed. Compositions for use in and methods for generating electric energy from chemical energy using fuel cells are also disclosed. Compositions for use in and methods of storing energy using fuel cells are also disclosed.

21 Claims, 2 Drawing Sheets

U.S. PATENT DOCUMENTS

| | | |
|---|---|---|
| 6,420,648 B1 | 7/2002 | Lindsey |
| 6,531,239 B2 | 3/2003 | Heller |
| 6,596,431 B1 | 7/2003 | Sotomura et al. |
| 6,596,935 B2 | 7/2003 | Lindsey et al. |
| 6,682,845 B2 | 1/2004 | Shiepe et al. |
| 6,824,920 B1 | 11/2004 | Iwamoto et al. |
| 7,033,674 B2 | 4/2006 | Thorp et al. |
| 7,129,000 B2 | 10/2006 | Sotomura et al. |
| 2002/0161323 A1 | 10/2002 | Miller et al. |
| 2002/0164520 A1 | 11/2002 | Mizusawa et al. |
| 2003/0148169 A1 | 8/2003 | Willner et al. |
| 2004/0028612 A1 | 2/2004 | Singaram et al. |
| 2004/0101741 A1 | 5/2004 | Minteer et al. |
| 2004/0241528 A1 | 12/2004 | Chiao et al. |
| 2004/0258562 A1 | 12/2004 | Mills et al. |
| 2005/0053825 A1 | 3/2005 | Sakai et al. |
| 2005/0074669 A1 | 4/2005 | Park et al. |
| 2005/0079326 A1 | 4/2005 | Varaprasad et al. |
| 2005/0095466 A1 | 5/2005 | Minteer et al. |
| 2005/0106425 A1 | 5/2005 | Damore et al. |
| 2005/0118494 A1 | 6/2005 | Choi |
| 2005/0130248 A1 | 6/2005 | Willner et al. |
| 2005/0164073 A1 | 7/2005 | Feron et al. |
| 2005/0187527 A1 | 8/2005 | Rix |
| 2005/0208372 A1 | 9/2005 | Watson et al. |
| 2006/0001550 A1 | 1/2006 | Mann et al. |
| 2006/0083688 A1 | 4/2006 | Singaram et al. |
| 2006/0194097 A1 | 8/2006 | Kim et al. |
| 2006/0267235 A1 | 11/2006 | Ma et al. |
| 2006/0269826 A1 | 11/2006 | Katz et al. |

OTHER PUBLICATIONS

Hünig, S., "Stable Radical Ions," Pure and Applied Chemistry, 15(1):109-122 (1967).

Hünig, S. and Berneth, H., "Two Step Reversible Redox Systems of the Weitz Type," Organic Chemistry, 92:1-44, Springer Berlin / Heidelberg: New York (1980).

Wiley, "Chapter 21: Biochemical fuel cells," vol. 1: Fundamentals and Survey of Systems, Handbook of Fuel Cells—Fundamentals, Technology and Applications, John Wiley & Sons, Ltd., 27 pages (2003).

* cited by examiner

FUEL CELL AND METHOD FOR GENERATING ELECTRIC POWER

CROSS REFERENCE TO RELATED APPLICATIONS

This application is a 371 national phase of PCT/US2008/006155, filed May 14, 2008, and claims the benefit under 35 U.S.C. §119(e) of U.S. Provisional Application No. 60/917,866, filed May 14, 2007, the disclosures of which are incorporated, in their entirety, by this reference.

TECHNICAL FIELD OF THE INVENTION

The present invention relates to compositions, devices, and methods of generating electricity using the chemical potential of an organic fuel containing a hydroxyl group, including simple alcohols and carbohydrates, with non-metallic catalysts that are violenen compounds, such as pyridinium and conjugated aryl pyridinium compounds including viologen, in non-microbial systems, e.g., in fuel cells and batteries.

BACKGROUND

Like proteins and lipids, carbohydrates are an important energy source for biological organisms. Glucose, represented by the chemical formula: $C_6H_{12}O_6$, is a typical example of a carbohydrate. Glucose is an abundant biomolecule that is formed during photosynthesis by the 24-electron reduction of atmospheric $CO_2$ with water ($H_2O$) according to the following reaction:

$$6CO_2 + 6H_2O + h\nu \rightarrow C_6H_{12}O_6 + 6O_2 \qquad (1)$$

Biological organisms can, therefore, store energy from sunlight in carbohydrates. Later, a biological organism meets its metabolic needs by the reverse reaction, i.e. oxidation of carbohydrates. For example, the complete oxidation of glucose can result in the release of 24 electrons and the concomitant production of carbon dioxide and water. Some biological systems harness the oxidation of glucose as an energy source for heat.

The methods for utilizing the electro-potential energy of carbohydrates in batteries or fuel cells have been limited to systems using biological mechanisms and organisms. Biological organisms harness carbohydrate oxidation through respiration mechanisms such as the action of enzymatic oxidases or the ATP cycle (see Alberts et al., Essential Cell Biology, Garland Publishing, Inc. 1997, p. 107). The use of biological organisms for the production of electrical current in batteries is, however, limited by the conditions where microorganisms and associated enzymes can function (i.e., appropriate temperature, pH, salinity, etc). There remains, therefore, a need to use a renewable source of energy in fuel-cells and batteries, without biological mechanisms and where the electro-potential energy of organic compounds containing one or more hydroxyl groups (i.e., a hydroxyl-containing organic fuel), including carbohydrates, is harnessed for the production of electrical current.

SUMMARY OF THE INVENTION

The present invention relates to a method for generating electric power and, in particular, non-microbial fuel cells utilizing an alcohol source for energy.

In one aspect, a fuel cell is disclosed, comprising a positive electrode, a negative electrode and, an electrolyte intervening between the positive electrode and the negative electrode, the electrolyte further comprising an organic fuel containing a hydroxyl group and a non-metallic catalyst. In some embodiments, the fuel cell may also include a polymer that attaches the non-metallic catalyst to at least one of the electrodes.

In another aspect, a composition for use as an energy source in a fuel cell is disclosed, comprising an organic fuel containing a hydroxyl group and a non-metallic catalyst.

In another aspect, a method for generating electric power is disclosed, comprising providing a positive electrode, providing a negative electrode, providing an electrolyte intervening between the positive electrode and the negative electrode, the electrolyte further comprising an organic fuel containing a hydroxyl group and a non-metallic catalyst, and contacting the positive electrode and the negative electrode with a conductor. In some embodiments, a polymer that attaches the non-metallic catalyst to at least one of the electrodes may be present.

In another aspect, a method of storing electric power is disclosed, comprising providing a positive electrode, a negative electrode, and an electrolyte intervening between the positive electrode and the negative electrode, the electrolyte further comprising an organic fuel containing a hydroxyl group and a non-metallic catalyst. In some embodiments, a polymer may be present that attaches the non-metallic catalyst to at least one of the electrodes.

In one embodiment, the negative electrode is adapted for electrochemically oxidizing and decomposing the organic fuel containing a hydroxyl group, wherein the organic fuel containing a hydroxyl group is oxidized and decomposed to generate an electromotive force between the negative electrode and positive electrode.

In one embodiment, the organic fuel containing a hydroxyl group is a carbohydrate. In one embodiment, the organic fuel containing a hydroxyl group is a carbohydrate selected from the group consisting of a monosaccharide, an initial product obtained from decomposition of a monosaccharide, a disaccharide, an oligosaccharide, and a polysaccharide. In one embodiment, the organic fuel containing a hydroxyl group is selected from the group consisting of glucose, mannose, fructose, and galactose. In one embodiment, the organic fuel containing a hydroxyl group is glucose. In one embodiment, the organic fuel containing a hydroxyl group is fructose. In one embodiment, the organic fuel containing a hydroxyl group is glycerol. In one embodiment, the organic fuel containing a hydroxyl group is glyceraldehyde. In one embodiment, the hydroxyl containing fuel is dihydroxyacetone. In one embodiment, the organic fuel containing a hydroxyl group is an aminosugar. In some embodiments, the organic fuel containing a hydroxyl group has a carbonyl group (e.g. an aldehyde or ketone). In some embodiments, the organic fuel containing a hydroxyl group has an aldehyde group.

In one embodiment, the organic fuel containing a hydroxyl group is an alcohol. In one embodiment, the hydroxyl containing fuel is selected from the group consisting of methanol, ethanol, propanol, isopropanol, butanol, isobutanol, sec-butanol, and tert-butanol. In one embodiment, the hydroxyl containing fuel is methanol. In one embodiment, the hydroxyl containing fuel is ethanol.

In one embodiment, the non-metallic catalyst is a violene having the formula X—(CR=CR')$_n$—X'; where X and X' are independently selected from oxygen, sulfur, or nitrogen, each independently substituted with H, alkyl, alkylaryl, alkylthio, and alkylammonium; (CR=CR') is an aromatic group or apart of an aromatic group; n is an integer so long as aromaticity of (CR=CR') is maintained; and R and R' are each independently H or a bond.

In some embodiments, the non-metallic catalyst is selected from one or more of a pyridinium compound, a conjugated pyridinium compound, and a bipyridinium compound. In one embodiment, the non-metallic catalyst is a pyridinium compound. In one embodiment, the non-metallic catalyst is a compound having the formula:

where $R^1$ is selected from the group consisting of alkyl, alkylaryl, alkylthio, and alkylammonium, wherein the pyridinium ring may be optionally substituted with an electron withdrawing group or electron donating group. In one embodiment, the non-metallic catalyst is a conjugated pyridinium compound. In one embodiment, the non-metallic catalyst is a compound having the formula:

where $R^1$ is selected from the group consisting of alkyl, alkylaryl, alkylthio, and alkylammonium, Ar is aryl, $A^-$ is an anion, wherein the pyridinium ring and Ar may be optionally substituted with an electron withdrawing group or electron donating group. In one embodiment, the non-metallic catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl; each $R^2$, $R^3$, $R^4$, $R^7$, $R^8$, $R^9$ is independently selected from the group consisting of H, alkyl, alkylaryl, alkylthio, alkylammonium, an electron donating group, and an electron withdrawing group; each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl; each $A^-$ is independently an anion; each $Y^1$, $Y^2$, $Y^3$, $Y^4$, $Y^5$, $Y^6$, $Y^7$, $Y^8$, $Y^9$, and $Y^{10}$ are independently C or N, wherein at least one of $Y^1$, $Y^2$, $Y^3$, $Y^4$, $Y^5$, $Y^6$, $Y^7$, $Y^8$, $Y^9$, and $Y^{10}$ is N and the R group geminal to N is selected from the group consisting of alkyl, alkylaryl, alkylthio, and alkylammonium. In one embodiment, the non-metallic catalyst is a bipyridinium compound such as 1,1'-ethylene-2,2' bipyridinium dichloride or 1',2,3,6-tetramethyl-2',4-bipyridinium diiodide. In one embodiment, the non-metallic catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl; each $R^2$, $R^3$, $R^4$, $R^7$, $R^8$, $R^9$ is independently selected from the group consisting of H, alkyl, alkylaryl, alkylthio, alkylammonium, an electron donating group, and an electron withdrawing group; each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl; each $A^-$ is independently an anion; each $Y^1$, $Y^2$, $Y^3$, $Y^4$, $Y^5$, $Y^6$, $Y^7$, $Y^8$, $Y^9$, and $Y^{10}$ are independently C or N, wherein at least one of $Y^1$, $Y^2$, $Y^3$, $Y^4$, and $Y^5$, is N and at least one of $Y^6$, $Y^7$, $Y^8$, $Y^9$, and $Y^{10}$ is N and the R group geminal to each N is selected from the group consisting of alkyl, alkylaryl, alkylthio, and alkylammonium. In one embodiment, the non-metallic catalyst is a viologen. In one embodiment, the non-metallic catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl; each $R^2$, $R^4$, $R^7$, $R^9$ is independently selected from the group consisting of H, alkyl, alkylaryl, alkylthio, alkylammonium, an electron donating group, and an electron withdrawing group; each $R^3$ and $R^8$ is independently selected from the group consisting of alkyl, alkylaryl, alkylthio, alkylammonium, an electron donating group, and an electron withdrawing group; each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl; each $A^-$ is independently an anion. In one embodiment, the non-metallic catalyst is selected from the group consisting of benzyl viologen dichloride, octadecyl viologen dibromide, ethyl viologen dibromide, ethyl viologen dioxide, ethyl viologen diperchlorate, methyl viologen dichloride, and isopropyl viologen dichloride.

In one embodiment, the electrolyte comprises an aqueous solution of a metal salt. In one embodiment, the electrolyte comprises an organic solvent. In one embodiment, the electrolyte comprises a solvent selected from the group consisting of dimethylformamide and dimethylsulfoxide. In one embodiment, the electrolyte has a pH of between about 7 and about 14. In one embodiment, the electrolyte has a pH of between about 9 and about 12. In one embodiment, the electrolyte has a pH of about 10. In one embodiment, the electrolyte has a pH of about 11. In one embodiment, the pH is greater than about 7. In one embodiment, the pH is greater than about 10. In one embodiment, the pH is greater than about 10.5. In one embodiment, the pH is greater than about 11. In one embodiment, the electrolyte comprises a basic salt. In one embodiment, the electrolyte comprises one or more cations from the group lithium, sodium, potassium, rubidium, cesium, beryllium, magnesium, calcium, strontium, and barium, and one or more anions from the group hydroxide, bicarbonate, and carbonate.

DETAILED DESCRIPTION

Definitions

While the terminology used in this application is standard within the art, the following definitions of certain terms are provided to assure clarity.

Units, prefixes, and symbols may be denoted in their SI accepted form. Numeric ranges recited herein are inclusive of the numbers defining the range and include and are supportive of each integer within the defined range. Unless otherwise noted, the terms "a" or "an" are to be construed as meaning "at least one of." The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

The term "alcohol" as used herein, means hydrocarbons bearing one or more hydroxyl (—OH) groups, including primary, secondary, and tertiary alcohols, including carbohydrates. Examples of primary alcohols include methanol, ethanol, propanol, butanol, and the like. An example of a secondary alcohol is isopropanol. An example of a tertiary alcohol is tert-butanol.

The term "alkyl" as used herein, means a straight or branched hydrocarbon radical or group having at least one carbon atom including but not limited to saturated $C_1$-$C_6$ such as: methyl, ethyl, 1-propyl and 2-propyl, 1-butyl, 2-butyl, 2-methyl-1-propyl, 1,1-dimethylethyl, 1-pentyl, 2-pentyl, 3-pentyl, 2-methyl-1-butyl, 3-methyl-1-butyl, 2,2-dimethylpropyl, 1-hexyl, 2-hexyl, 3-hexyl, 2-methyl-1-pentyl, 3-methyl-1-pentyl, 4-methyl-1-pentyl, 3,3-dimethyl-1-butyl, 3,3-dimethyl-2-butyl, 2-ethyl-1-butyl and the like; $C_7$-$C_{12}$ such as: 1-heptyl, 2-heptyl, 3-heptyl, 4-heptyl, 2-methyl-1-hexyl, 4-methyl-1-hexyl, 5-methyl-1-hexyl, 1-octyl, 2-octyl, 3-octyl, 4-octyl, 6-methyl-1-heptyl, 5,5-dimethyl-1-hexyl, 2-ethyl-1-hexyl, 2-methyl1-1-heptyl, 2-propyl-1-pentyl, 1-nonyl, 2-nonyl, 2-ethyl-2-methyl-1-hexyl, 4-methyl-1-octyl, 3,5,5-trimethyl-1-hexyl, 1-decyl, 2-decyl, 4-ethyl-1-octyl, 2-methyl-1-nonyl, 4-methyl-1-nonyl, 8-methyl-1-nonyl, 1-undecyl (1-hendecyl), 2-undecyl, 7-methyl-1-decyl, 1-dodecyl, 5-dodecyl, 2-butyl-1-octyl, 10-methyl-1-undecyl and the like; $C_{13}$-$C_{18}$ such as: 1-tridecyl, 4-methyl-1-dodecyl, 11-methyl-1-dodecyl, 1-butyldecyl, 11-methyl-1-tridecyl, 1-pentadecyl, 1-hexadecyl, 2-hexyl-1-decyl, 1-heptadecyl, 14-methyl-1-hexadecyl, 15-methyl-1-hexadecyl, 1-octadecyl, 16-methyl 1-heptadecyl and the like; $C_{19}$-$C_{32}$ such as 1-nonadecyl, 2-methyl-1-octadecyl, 10-methyl-1-octadecyl, 17-methyl-1-octadecyl, 2,6,10,14-tetramethylpentadecyl, 1-eicosyl (1-arachidinyl, 1-leicosanyl), 18-methyl-1-nonadecyl, 1-heneicosyl, 19-methyl-1-eicosyl and 1-docosyl (1-behenyl), 1-tricosyl, 1-tetracosyl, 1-pentacosyl, 1-hexacosyl, 1-heptacosyl, 1-octacosyl, 1-nonacosyl, 1-triaconstyl, 2,6,10,15,19,23-hexamethyl-1-tetracosyl, 1-hentriaconsyl, 1-dotriacontyl and the like. Alkyl groups may be unsubstituted or substituted. Alkyl also includes groups having three or more carbons that contain 1 or more sites of unsaturation, that group being known as cycloalkyl groups or radicals.

The term "cycloalkyl" as used herein means a monocyclic or polycyclic hydrocarbyl group. Illustrative examples of a cycloalkyl group or radical include cyclopropyl, cycloheptyl, cyclooctyl, cyclodecyl, cyclobutyl, adamantyl, norpinanyl, decalinyl, norbornyl, cyclohexyl, and cyclopentyl. Cycloalkyl groups may be unsubstituted or substituted.

The term "aryl" means an aromatic carbocyclic ring having from 6 to 14 carbon atoms. Illustrative examples of an aryl group or radical include, but are not limited to, phenyl, 1-naphthyl, 2-naphthyl, 1-anthryl, 2-antrhyl, 9-anthryl, 1-phenanthryl, 2-phenanthryl, 3-phenanthryl, 4-phenanthryl, 5-phenanthryl, and the like; including fused ring systems with rings that have less than 6 carbons such as 1-acenaphthyl, 3-acenaphthyl, 4-acenaphthyl, 5-acenaphthyl, 1-azulyl, 2-azulyl, 4-azulyl, 5-azulyl, 6-azulyl and the like. Aryl groups may be unsubstituted or substituted with one or more electron donating groups and electron withdrawing groups. The term "aryl" also includes heteroaryls unless otherwise designated.

The term "heteroaryl" means an unsaturated monocyclic group or radical of 5 or 6 atoms, an unsaturated fused bicyclic group or radical of from 8 to 10 atoms, or an unsaturated fused tricyclic group or radical of from 11 to 14 atoms, the cyclic groups having 1 or 2 heteroatoms independently selected from O, N, or S. Illustrative examples of monocyclic heteroaryl include 2- or 3-thienyl, 2- or 3-furanyl, 1-, 2-, or 3-pyrrolyl, 1-, 2-, or 4-imidazolyl, 1-, 3-, or 4-pyrazolyl, 2-, 4-, or 5-oxazolyl, 2-, 4-, or 5-thiazolyl, 3-, 4-, or 5-isoxazolyl, 3-, 4-, or 5-isothiazolyl, 2-, 3-, or 4-pyridinyl, 3- or 4-pyridazinyl, 2- or 3-pyrazinyl, and 2-, 4-, or 5-pyrimidinyl. Illustrative examples of bicyclic heteroaryl include 2-, 3-, 4-, 5-, 6-, 7-, or 8-quinolinyl, 1-, 3-, 4-, 5-, 6-, 7-, or 8-isoquinolinyl, 1-, 2-, 3-, 4-, 5-, 6-, or 7-indolyl, 2-, 3-, 4-, 5-, 6-, or 7-benzo[b]thienyl, 2-, 4-, 5-, 6-, or 7-benzofuran, 2-, 4-, 5-, 6-, or 7-benzoxazolyl, 2-, 4-, 5-, 6-, or 7-benzothiazolyl, and 1-, 2-, 3-, 4-, 5-, 6-, or 7-benzimidazolyl. Illustrative examples of tricyclic heteroaryl include 1-, 2-, 3-, or 4-dibenzofuranyl, 1-, 2-, 3-, or 4-dibenzothienyl, and 1-, 2-, 3-, 4-, 5-, 6-, 7-, 8-, or 9-(1,2,3,4-tetrahydroacridinyl). Heteroaryl groups may be unsubstituted or substituted.

As used above, a fused bicyclic group or radical is a group wherein two ring systems share two and only two atoms. As used above, a fused tricyclic group or radical is a group wherein three ring systems share four and only four atoms.

The terms "alkylaryl" and "arylalkyl" as used herein, means an alkyl portion where alkyl is defined above and to include an aryl portion where aryl is defined above. Illustrative examples of alkylaryl include, but are not limited to, toluene, ethylbenzene, propylbenzene, and xylene. Examples of arylalkyl include, but are not limited to benzyl, 2-phenylethyl, 3-phenylpropyl, 4-phenylethyl, phenylpropyl, 3-methyl-3-phenylpropyl, 1-naphthylmethyl, 1-naphthylethyl, 3-(1-naphthyl)-propyl, 4-(1-naphthyl)-butyl, 4-(2-naphthyl)-butyl, and 4-phenylheptyl.

The term "alkylthio" as used herein, means straight or branched chain alkylsulfides of from 1 to 18 ($C_1$-$C_{18}$) carbons with a sulfide group. Illustrative examples include, but are not limited to, methylthio, ethylthio, isopropylthio.

The term "alkylammonium" as used herein, means radical or group containing a cationic nitrogen (also called a quaternary nitrogen, or tetravalent nitrogen) with one or more alkyl groups as defined above. Examples include, but are not limited to monoalkylammonium, dialkylammonium, trialkylammonium, and tetraalkylammounium. In compounds with an alkylammonium group, a counterion, i.e., an anion, is usually present to offset the positive charge.

The term "alkali" as used herein, means any hydroxide base with an alkaline or alkaline earth metal. Examples include, but are not limited to, lithium hydroxide, sodium hydroxide, potassium hydroxide, rubidium hydroxide, cesium hydroxide, beryllium hydroxide, magnesium hydroxide, calcium hydroxide, strontium hydroxide, and barium hydroxide.

The term "carbohydrate" as used herein, means aldoses and ketoses having the general stoichiometric formula $C_n(H_2O)_n$, and includes monosaccharides, oligosaccharides and polysaccharides as well as substances derived from monosaccharides by reduction of the carbonyl group (alditols) such as glycerol (glycerin), maltitol, sorbitol, and isomalt, by oxidation of one or more terminal groups to carboxylic acids, or by replacement of one or more hydroxy group(s) by a hydrogen atom, an amino group (amino sugar), thiol group or similar groups. It also includes derivatives of these compounds. By way of example, carbohydrates include sugars such as such as glucose, mannose, galactose, fructose, glyceraldehyde, dihydroxyacetone, erythrose, ribulose, xylulose, sedoheptulose, ribose, deoxyribose, sorbose, glucosamine, and galactosamine; disaccharides such as isomaltose, maltose, cellobiose, lactose, rafftnose, and sucrose; ketoses including trioses such as dihydroxyacetone, tetroses such as erythrulose, pentoses such as ribulose and xylulose, and hexoses such as fructose, psicose, sorbose, tagatose; aldoses including trioses such as glyceraldehyde, tetroses such as erythrose and threose, pentoses such as ribose, arabinose, xylose, and lyxose, and hexoses such as allose, atlrose, glucose, mannose, gulose, idose, galactose, talose; oligosaccharides; polysaccharides such as starch, glycogen, cellulose, glycoprotein, glycosaminoglycan, and glycolipid.

The term "amino sugar" as used herein means monosaccharides having one hydroxyl group, i.e., alcohol, (commonly but not necessarily in position 2) replaced by an amino group, systematically known as x-deoxy-x-monosaccharides. By way of example, D-glucosamine or 2-amino-2-deoxy-D-glucopyranose is an amino sugar. Other illustrative amino sugars include but are not limited to erythrosamine, threosamine, ribosamine, arabinosamine, xylosamine, lyxosamine, allosamine, altrosamine, glucosamine, mannosamine, idosamine, galactosamine, talosamine, and their derivatives. The amino sugars include both aldose and ketose sugars. Additionally, the amino sugars may be of a straight-chain structure; however, the aldehyde or ketone group of the amino sugar may react with a hydroxyl group on a different carbon atom to form a hemiacetal or hemiketal, in which case there is an oxygen bridge between the two carbon atoms, forming a heterocyclic ring. Amino sugar rings with five and six atoms are called furanose and pyranose forms, respectively and exist in equilibrium with their corresponding straight-chain form. It should be noted that the ring form has one more optically active carbon than the straight-chain form, and so has both an α and a β form, which interconvert in equilibrium. The term "amino sugar" also means glycosylamines, amino sugars where the nitrogen is substituted with a functional group other than H. Illustrative examples of glycosylamines include N-acetylglucosamine, N-methylglucosamine.

The term "violene" and "violene compound" as used herein means a compound of the general formula X—(CR=CR')$_n$—X', where X and X' are independently a heteroatom such as oxygen, sulfur, or nitrogen independently substituted with H, alkyl, alkylaryl, alkylthio, and alkylammonium; (CR=CR') is an aromatic group or apart of an aromatic group; n is an integer so long as aromaticity of (CR=CR') is maintained; and R and R' are each independently H or a bond. Violene compounds may be characterized by the stability of their radical cations through delocalization throughout a π-framework together with a heteroatom.

Violene compounds include compounds that can become Weitz-type radicals and Würster-type radicals. The substituted heteroatom (N—R for example) or heteroatoms in Weitz-type radicals are directly incorporated within the aromatic system, for example viologen compounds including pyridiniums that are defined below. The substituted heteroatom or heteroatoms in Würster-type radicals are not directly incorporated within the aromatic system, for example $N^1,N^1$, $N^4,N^4$-tetramethylbenzene-1,4-diamine and $N^4,N^4,N^{4'},N^{4'}$-tetramethylbiphenyl-4,4'-diamine. Additional examples of violene compounds may be found in Hunig, Pure Appl. Chem. 1967, 15, 109-122 and Hunig et al., Top. Curr. Chem. 1980, 92, 1-44, which are hereby incorporated by reference.

The term "viologen" as used herein means 1,1'-di(hydrocarbyl)-4,4'-bipyridinium salt.

The term "pyridinium compound" as used herein means a cationic form of pyridine by the addition of a substituent to the ring nitrogen, i.e., by alkylation.

The term "conjugated pyridinium compound" as used herein means a compound including at least one pyridinium substructure conjugated to an aryl substructure.

The terms "bipyridinium compound" and "bipyridillium compound" as used herein means two pydrinium or pyridillium compounds sharing a common carbon-carbon bond.

The term "anion" as used herein means a monoatomic or polyatomic species having one or more negative charges. By way of example, an anion can be a halide anion such as $F^-$ (fluoride), $Cl^-$ (chloride), $Br^-$ (bromide), and $I^-$ (iodide). Other examples of ions include $AsO_4^{3-}$ (arsenate), $AsO_3^{3-}$ (arsenite), $BO_3^{3-}$ (borate), $BrO_3^-$ (bromate), $BrO^-$ (hydrobromite), $CO_3^{2-}$ (carbonate), $HCO_3^-$ (hydrogen carbonate or bicarbonate), $ClO_3^-$ (chlorate), $ClO_4^-$ (perchlorate), $ClO_2^-$ (chlorite), $ClO^-$ (hypochlorite), $CrO_4^{2-}$ (chromate), $Cr_2O_7^{2-}$ (dichromate), $IO_3^-$ (iodate), $NO_3^-$ (nitrate), $NO_2^-$ (nitrite), $PO_4^{3-}$ (phosphate), $HPO_4^{2-}$ (hydrogen phosphate), $H_2PO_4^-$ (dihydrogen phosphate), $MnO_4^-$ (permanganate), $PO_3^{3-}$ (phosphite), $SO_4^{2-}$ (sulphate), $S_2O_3^{2-}$ (thiosulfate), $HSO_4^-$ (hydrogen sulphate or bisulphate), $SO_3^{2-}$ (sulphite), $HSO_3^-$ (hydrogen sulfite or bisulphate), $C_2H_3O_2^-$ (acetate), $HCO_2^-$ (formate), $C_2O_4^{2-}$ (oxalate), $HC_2O_4^-$ (hydrogen oxalate or bioxalate), $HS^-$ (hydrogen sulfide or bisulphide), $Te^{2-}$ (telluride), $OCN^-$ (cyanate), $SCN^-$ (thiocyanate), and $CN^-$ (cyanide).

The term "hydroxyl" as used herein means a compound in which an —OH is attached to a saturated carbon atom, e.g., $R_3COH$.

The term "electrode" as used herein means an electric conductor through which an electric current enters or leaves an electrolytic cell.

The term "electrolyte" as used herein means any substance that dissociates into ions when dissolved in a suitable medium or melted and thus forms a conductor of electricity. By way of example, an electrolyte can be sodium chloride (NaCl, table salt).

The terms "electron-withdrawing" or "electron-donating" refer to the ability of a substituent to withdraw or donate electrons relative to that of hydrogen if hydrogen occupied the same position in the molecule. These terms are well-understood by one skilled in the art and are discussed in Advanced Organic Chemistry by J. March, 1985, pp. 16-18, incorporated herein by reference. Examples of electron withdrawing groups include, but are not limited to, halo (F, Cl, Br, I), nitro, carboxyl, carboxaldehyde, carboxyamido, and trifluoromethyl ($CF_3$). Examples of electron donating groups include, but are not limited to hydroxy, amino, alkylamino, dialkylamino, aryloxy, mercapto, alkylthio, and alkylmercapto. One skilled in the art will appreciate that the aforesaid substituents may have electron donating or electron withdrawing properties under different chemical conditions.

The term "non-metallic catalyst" as used herein means a violene compound such as an organic compound with a pyridinium group capable of transferring an electron from a hydroxyl group from another organic compound to an electrode. Voilene compounds with a pyrdinium group may be conjugated to other unsaturated π-systems including aromatic systems with or without heteroatoms. The conjugated system of violenes with a π-framework, including heteroatoms when present, promotes the stability of radical cations transiently produced when electrons are transferred from an organic fuel containing a hydroxyl group to an oxidizing agent, such as atmospheric oxygen.

The present invention is directed to compositions and devices utilizing a renewable energy source and a catalyst for the production of electrical current. The renewable energy source can include an organic compound bearing a hydroxy (or hydroxyl) functional group. For example, the renewable energy source can be an alcohol. The alcohol may be monohydric (containing at least one hydroxyl group) or polyhydric (containing at least two hydroxyl groups). The organic compound bearing a hydroxyl group may be a carbohydrate.

The catalyst used in the production of an electrical current from the renewable energy source can be a violene, such as a viologen compound, a pyridinium compound, a conjugated pyridinium compound, or a bipyridinium compound.

In one embodiment, the catalyst can be a violene compound having the general formula X—(CR=CR')$_n$—X', where X and X' are independently a heteroatom such as oxygen, sulfur, or nitrogen (independently substituted with H, alkyl, alkylaryl, alkylthio, and alkylammonium); (CR=CR') is an aromatic group or apart of an aromatic group; n is an integer so long as aromaticity of (CR=CR') is maintained; and R and R' are each independently H or a bond.

In some embodiments, the violene compound is a pyridinium compound. Thus, in these embodiments, the catalyst is a pyridinum compound represented by the formula:

where $R^1$ is selected from the group consisting of alkyl, alkylaryl, alkylthio, and alkylammonium. Optionally, the pyridinium ring may be substituted with an electron withdrawing group or electron donating group.

In some embodiments, the violene compound is a conjugated pyridinium compound. Thus, in these embodiments, the catalyst is a conjugated pyridinium compound represented by the formula:

where $R^1$ is selected from the group consisting of alkyl, alkylaryl, alkylthio, and alkylammonium. Ar is aryl, which is optionally substituted with an electron withdrawing group or an electron donating group. K is an anion. Optionally, the pyridinium ring may be substituted with an electron withdrawing group or electron donating group.

In some embodiments, the violene compound is a bipyridinium compound. Thus, in these embodiments, the catalyst is a bipyridinium compound represented by the formula:

where each $R^1$ and $R^{10}$ is independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl. Each $R^2$, $R^3$, $R^4$, $R^7$, $R^8$, $R^9$ are independently selected from the group consisting of H, alkyl, alkylaryl, alkylthio, alkylammonium, an electron donating group, and an electron withdrawing group. Each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl. Each $A^-$ is independently an anion. Each $Y^1$, $Y^2$, $Y^3$, $Y^4$, $Y^5$, $Y^6$, $Y^7$, $Y^8$, $Y^9$, and $Y^{10}$ are independently C or N, wherein at least one of $Y^1$, $Y^2$, $Y^3$, $Y^4$, $Y^5$, $Y^6$, $Y^7$, $Y^8$, $Y^9$, and $Y^{10}$ is N and the R group geminal to N is selected from the group consisting of alkyl, alkylaryl, alkylthio, and alkylammonium.

In some embodiments, the bipyridinium compound may be a 4,4'-bipyridinium compound represented by the formula:

where $R^1$-$R^{10}$ and $A^-$ have the meanings provided above.

In some embodiments, the 4,4'-bipyridinium compound may be a viologen. By way of examples, a viologen can be

1,1'-dibenzyl-4,4'-bipyridinium dichloride (benzyl viologen dichloride), 1,1'-dioctadecyl-4,4'-bipyridinium dibromide (octadecyl viologen dibromide), 1,1'-diethyl-4,4'-bipyridinium dibromide (ethyl viologen dibromide), 1,1'-diethyl-4,4'-bipyridinium diiodide (ethyl viologen diiodide), 1,1'-diethyl-4,4'-bipyridinium diperchlorate (ethyl viologen diperchlorate), 1,1'-dimethyl-4,4'-bipyridinium dichloride (methyl viologen dichloride), and 1,1'-diisopropyl-4,4'-bipyridinium dichloride (isopropyl viologen dichloride). Other examples of viologens are described in The Viologens: Physicochemical Properties, Synthesis and Applications of the Salts of 4,4'-Bipyridine; Monk, Paul S.; Wiley, (2001), which is incorporated herein by reference in its entirety.

In still another embodiment, the bipyridinium compound may be a 2,2'-bipyridium compound represented by the formula:

where $R^1$-$R^{10}$ and K have the meanings provided above. For example, the 2,2'-bipyridinium compound may be 1,1'-ethylene-2,2' bipyridinium dichloride or 1',2,3,6-tetramethyl-2',4-bipyridinium diiodide.

In yet another embodiment, the bipyridinium compound may be represented by the formula:

where $R^1$, $R^2$, and $A^-$ have the meanings provided above.

In the catalysts described above, one or more of the ring structures or individual R-labeled groups may be substituted with an alkylthio group. In some embodiments, the alkylthio group has from 2 to 3 carbons. The thio group can be bound to a metallic structure such as is commonly used in the field of fuel cells. Such metallic structures include particles of metal, metal oxide, or metal alloy, which in turn may be connected to other electrode materials such as carbon. The materials on which the catalyst is attached may have additional or complementary catalytic functionality. Such materials could include nickel (Ni), cobalt (Co), silver (Ag), gold (Au), platinum (Pt), and ruthenium (Ru) and corresponding metal oxides and mixtures comprised of the same. Binding of the catalyst to an electrode surface serves to promote efficiency in the transport of electrons between the electrode and the catalyst. Such binding also serves to retain catalyst inside the device, thus decreasing catalyst replacement requirements and potential for catalyst release to the environment In the catalysts described above, one or more of the ring structures may be substituted with one or more electron withdrawing groups and or electron donating groups. These ring substituents allow tuning of the electrode potential and can improve reactivity.

In the catalysts described above, one or more of the ring structures may be substituted with one or more positively charged alkyl ammonium groups.

In still another embodiment, the catalyst functionality can be attached to or incorporated into a polymer. Such a polymer can act to bring the catalyst functionality in proximity to the electrode and to restrict mobility of the catalyst. Thin films of polymer can enhance the efficiency of a fuel cell by promoting intimate contact between the electrolyte solution containing the renewable energy source, the electrode acting as a source or sink of electrons, and the catalyst. In addition, the polymer can be of an electronically conductive type so as to act better as an extension of the electrode and to minimize internal electronic resistance in the device.

In addition to the fuel and catalyst, an electrolyte may be present. The electrolyte may be in a solution of water (aqueous) or in an organic solvent, e.g., dimethylformamide or dimethylsulfoxide. The electrolyte may be a salt such as any salt in an electrolytic process, e.g., a metal salt.

The pH of the solution containing the electrolyte can be between about 7 and about 14. The pH of the solution containing the electrolyte can be between about 9 and about 12. The pH of the solution containing the electrolyte can be about 10. The pH of the solution containing the electrolyte can be about 11. The pH of the solution containing the electrolyte can be greater than about 7. The pH of the solution containing the electrolyte can be greater than about 10. The pH of the solution containing the electrolyte can be greater than about 10.5. The pH of the solution containing the electrolyte can be greater than about 11.

The solution containing the electrolyte can include an alkali. The alkali may be use for setting or adjusting the pH of the solution containing the electrolyte. The alkali may any one or more of lithium hydroxide, sodium hydroxide, potassium hydroxide, rubidium hydroxide, cesium hydroxide, beryllium hydroxide, magnesium hydroxide, calcium hydroxide, strontium hydroxide, and barium hydroxide. Ammonium hydroxide can also be used for adjusting the pH of the solution containing the electrolyte.

In one embodiment, an electrical potential may be generated by the oxidation of a carbohydrate fuel in the presence of a catalyst. For example, the oxidation of glucose can be visualized as occurring by the two half-cell reactions shown in Reactions 2 and 3 with the net effect shown in Reaction 4.

$$C_6H_{12}O_6 + 6H_2O = 6CO_2 + 24\,H^+ + 24\,e \qquad (2)$$

$$6\,O_2 + 24\,H^+ + 24\,e = 12\,H_2O \qquad (3)$$

$$C_6H_{12}O_6 + 6O_2 = 6CO_2 + 6H_2O \qquad (4)$$

Thus, an electrical potential can be generated by the oxidation of glucose to produce carbon dioxide and water. The carbon dioxide can take the form of carbonate. During the conversion of glucose to carbonate, alcohol, aldehyde, carboxylic and perhaps unsaturated compounds with these functional groups can form as intermediates. Partially oxidized glucose or alcohols could thus produce electricity as well as useful industrial and commercial intermediates.

Reaction 2 with glucose or other carbohydrates, however, is not spontaneous, i.e., it does not readily occur at an electrode. Biological systems enable this reaction with the use of enzymatic catalysts. Non-biological systems can enable the reaction with the use of some other catalyst. For example, a viologen catalyst enables the reaction to spontaneously take place. The viologen catalyst mediates the transfer of electrons from glucose in an inert electrode and provides a chemical pathway for reaction to occur. In the process, the viologen catalyst (such as methyl viologen represented by MV or alternately represented as MVo) is oxidized and reduced (represented as MVr). The reduced from of the catalyst is electroactive and transfers electrons to electrodes at −400 to −600 mV when compared to the normal hydrogen electrode at a pH of 7.0. The electron transfer results in oxidation of the reduced form of the viologen catalyst. Thereafter, the catalyst can participate in another reaction with a carbohydrate (or partially oxidized carbohydrate product) carrying away another electron for transfer to the electrode.

In one embodiment, electrical current can be generated from supplying a fuel cell with a solution of 5-10 mM of glucose in a buffered solution (0.25 M phosphate or carbonate) at a pH of from 10 to 12 under anaerobic conditions with 5-10 mM methyl viologen at a temperature of between 35 and 50° C. Under these conditions, methyl viologen is reduced (MVr) and glucose is oxidized. The buffer neutralizes the release of $H^+$ (see Reaction 2).

In another embodiment, electrical current can be generated from supplying a fuel cell with a solution of 5-10 mM of glucose in a buffered solution (0.25 M phosphate or carbonate) at a pH of from 10 to 12 with 5-10 mM methyl viologen at a temperature of between 35 and 50° C. Under these conditions, methyl viologen is reduced (MVr) and glucose is oxidized by an oxygen source, such as atmospheric oxygen giving the net Reaction 4.

Concentrations of more than 10 mM or less than 5 mM can be used.

EXAMPLES

1. Anaerobic Viologen-Glucose Reaction

A solution of 5 mM glucose and 5 mM methyl viologen dichloride, MV, was placed in an anaerobic vial. The pH dependence of the viologen-glucose reaction was measured while maintaining the reaction conditions at a temperature of 45° C. under anaerobic conditions (oxygen deprived). The reaction was allowed to proceed for a period of 1-3 hours followed by optical measurements of the amount of reduced methyl viologen (MVr) formed.

Figure 1:
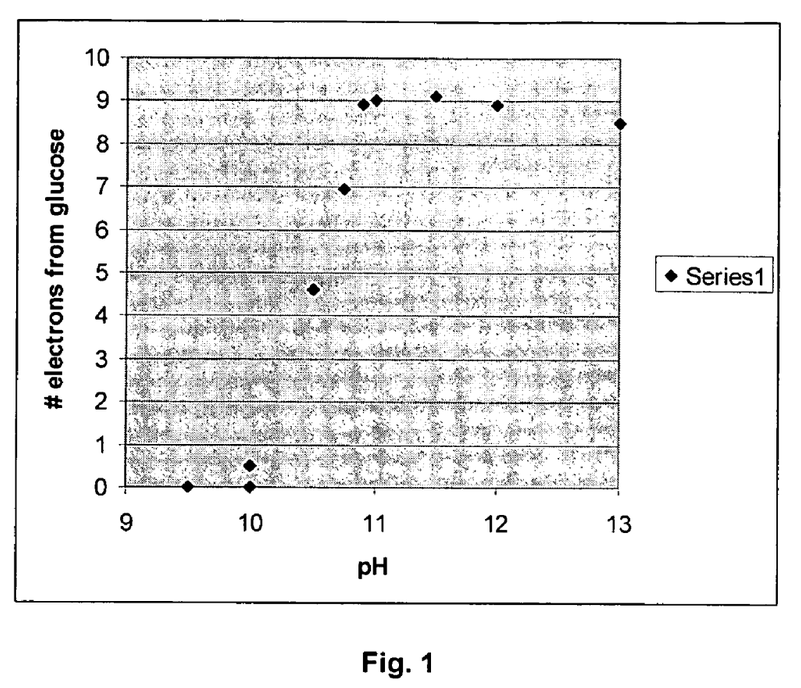
FIG. 1 is a graph depicting the number electrons obtained from oxidizing glucose with a catalyst at various pH values.

The measurements suggested, as depicted in FIG. 1, the catalytic oxidation of glucose with methyl viologen under anaerobic conditions is pH dependent. While glucose potentially has 24 electrons available to reduce MV, only about 9 of the 24 possible electrons transferred under anaerobic conditions. The limited number of electrons may be explained by an equilibrium condition being attained.

Above pH 11, MV reacts maximally with glucose to form MVr in a manner suggesting that an ionized form of glucose with a pKa>10 is required before oxidation by MVo can occur. MV does not have ionizable protons within this pKa range and is excluded from involvement. The data in FIG. 1 shows that under anaerobic conditions, glucose reduces only ~9 MVo, even though glucose is capable of a 24-electron reduction. If another oxidant is added after the reaction has occurred, such as $O_2$, $H_2O_2$, or $[Fe(CN)_6]^{3-}$, MVr is oxidized and the glucose-MV reaction continues until approximately 18-20 electrons are conducted away. While not wishing to be bound to any particular theory, it appears that the initial reaction producing ~9 MVr appears to be an equilibrium reaction, which shifts toward further oxidation of glucose as oxidant is added. Conducting the reaction in this two-step manner, however, does not completely oxidize glucose, possibly because a stable glucose oxidation intermediate is formed that may not continue to undergo oxidation by MVo.

2. MVo-Glucose Reaction in Air

Glucose and MVo were placed in sealed vials containing an atmosphere of ambient air. Under these conditions, glucose reduces MVo to MVr, and the $O_2$ present in the air reoxidizes MVr back to MVo, which then recycles and continues to oxidize glucose or other oxidized-glucose intermediates that are concomitantly formed. The decrease in pressure within the vial was assumed to represent $O_2$ reduction and depletion by glucose oxidation, and the amount of $O_2$ consumed was measured as a pressure decrease. The net result is the oxidation of glucose catalyzed by MV as shown in Reaction (4). As can be seen from the reaction scheme, the complete oxidation of a unit of glucose results in the production of 6 units of carbon dioxide. Table 1 shows that this ratio is approached for glucose oxidation over time intervals of approximately 6 hours.

TABLE 1

| Organic Fuel | # C atoms | $O_2$/Carbohydrate | Theoretical Rate | Relative Rate |
|---|---|---|---|---|
| Glucose | 6 | 5.3-5.8 | 6.0 | 1.0 |
| fructose | 6 | ~6.0 | 6.0 | 1.2 |
| ribose | 5 | 5.2 | 5.0 | 1.5 |
| ethyrose | 4 | 3.8 | 4.0 | 2.1 |
| glyceraldehyde | 3 | 3.2 | 3.0 | 2.5 |
| glucosamine | 6 | 5.7 | 6.0 | ~0.8 |
| maltose | 12 | ~8.0 | 12 | ~0.5 |
| lactose | 12 | ~8.2 | 12 | ~0.6 |

Table 1 also provides information for the reaction of MVo with a variety of other carbohydrate molecules under conditions employed in Example 1. In nearly all cases, the theoretical $O_2$/carbohydrate ratio values are nearly obtained. A control reaction involving glucose, buffer, and air or MVo, buffer, and air gave $O_2$/carbohydrate ratios of 0.05 or less, with no $O_2$ consumption in the MV control. This control indicates oxidation of carbohydrates by oxygen present in ambient air does not occur in the absence of a viologen catalyst and under the conditions examined.

A more detailed examination of the MV-catalyzed glucose oxidation reaction was made by monitoring the continuous decrease in pressure as the glucose oxidation reaction occurs under an atmosphere of ambient air. These results show that a reaction time of approximately 2 hours is required to oxidize 60-80% of a 5 mM glucose solution under the conditions. The remaining 20-40% of glucose in solution appears to oxidize more slowly (at a slower rate). The information in Table 1 shows the rates of carbohydrate oxidation for various carbohydrates. For example, fructose (a ketohexose) undergoes reaction slightly faster than glucose (an aldohexose). Both glucose and fructose are six-carbon carbohydrates. Viologen catalyzed oxidation of ribose (aldopentose), ethyrose (aldotetrose), and glyceraldehyde (aldotriose) were also observed with reaction rates are 1.5, 2.1 and 2.5 times faster than the glucose reaction.

The $O_2$/carbohydrate stoichiometries in Table 1 are also indicative that the carbohydrates are nearly oxidized to $CO_2$ and $H_2O$ by $O_2$. Under the conditions of the experiment (pH 11.5, 50° C.), $CO_2$ formation in situ will be present as a mixture of $HCO_3^-$ and $CO_3^{2-}$ (at pH 11.5).

Nuclear Magnetic Resonance (NMR) spectra were obtained before initiating the viologen mediated oxidation of glucose. Corresponding spectra after 3 hours were obtained when the $O_2$/glucose ratio indicated the reaction was approximately 66% complete. Spectra obtained at this stage of the reaction showed that glucose was no longer present. These results suggest that glucose was initially present at the beginning of the reaction but is absent after 3 hours. The results also show only low levels of carbon-hydrogen containing species. Mass spectral (MS) data also confirmed the absence of glucose after three hours of reaction. Both MS and NMR show that the MVo catalyst is present at about the same concentration before and after reaction, indicating that the catalyst is not consumed or altered in the reaction. When the reaction was allowed to go for 6 hours, an $O_2$/glucose ratio of 5.8:1 was measured. Both the $O_2$/glucose ratios and chemical identification techniques indicate that glucose can be oxidized by more than 60% with ambient air when catalyzed by viologens.

The reaction of various carbohydrate molecules in fluid contact with atmospheric oxygen were conducted using 10 mL sealed vials for 4-6 hours with 5 mM of methyl viologen present as catalyst. The reactions were run in 0.25 M phosphate buffer, at a pH 11.5 and at a temperature of 50° C. $O_2$ consumption was measured as a pressure decrease. The carbohydrate was present at 5 mM in a 1.0 mL volume. Glyceraldehyde and ethyrose react at room temperature but the other carbohydrates required a temperature of 50° C. before the reaction started.

3. Isotope Effect

In preparing the NMR samples, the MVo-glucose reaction was run in 98% $D_2O$ (deuterium oxide). The reaction proceeded at a slower rate compared to corresponding reactions conducted in $H_2O$. Closer examination showed that after approximately 3 hours (approximately 60% oxidation of glucose), a nearly two-fold slower reaction had occurred in $D_2O$ compared to the same reaction conducted in $H_2O$. For reactions conducted over 6-8 hours, a $O_2$/glucose ratio value of 5.7 (6.0 is expected for complete oxidation of glucose) and 3.7 were obtained in $H_2O$ and $D_2O$, respectively, indicating that $D_2O$ severely retarded the final stages of glucose oxidation by air. The isotope effect from oxidizing glucose in $D_2O$ is consistent with data obtained from anaerobic oxidation of glucose, i.e., that ionization of a proton with a pKa of approximately 10 works more effectively.

4. Fuel Cell Operation

A fuel cell, purchased from the Fuel Cell Store (Boulder, Colo.), and modified to replace the membrane electrode assembly was utilized with glucose as fuel and methyl viologen (MV) as anode catalyst. The cell produced an open circuit voltage of 0.75 V in <10 min with 0.01 M glucose at pH 12 and 60° C. The voltage and current were monitored as a function of time with a Princeton Applied Research Model 2373A Potentiostat/Galvanostat. The anode compartment contained a nickel-mesh current collector and an electrolyte solution of approximate volume 8 mL, comprising MV and 0.01 M glucose, buffered to pH 12 and maintained at 60° C. During operation, atmospheric oxygen was excluded from the anode compartment. The cathode compartment comprised a commercially available oxygen cathode of approximate area 8 $cm^2$ (E-5, Electric Fuel Limited, Bet Shemesh, Israel) in contact with ambient air and electrolyte. When a load was applied such that the cell operated at 400 mV potential difference, the cell produced a steady-state current of 11.5 mA within 15 minutes and sustained this current for approximately 80 further minutes after which the current began to decrease. Thereafter, the fuel solution was removed and analyzed. The solution's pH had decreased to a value less than 10. Furthermore, bicarbonate and formate were detected from $C^{13}$ NMR analysis. These results show that glucose was oxidized electrocatalytically. In contrast to the above results, when either MV or glucose was omitted from the liquid mixture initially placed in the anode compartment, open circuit potentials of ~400 mV or less were measured and the cell produced essentially zero current under load, illustrating the efficacy of the non-metallic catalyst.

In another experiment a solution of glucose (5 mM) and methyl viologen MVo (10 mM) was dissolved in a 0.25 M phosphate buffer (pH=11.5). The solution was anaerobically added to a commercially available demonstration kit containing a membrane-electrode assembly designed for use in methanol-powered fuel cells (Hydro-Genius Methanol Fuel Cell Science Kit, Heliocentris Model 356E/356, Berlin Germany). The fuel cell cathode was in operating contact with ambient air and the whole unit was maintained at 45° C. Current measurements were monitored over time. A voltage difference of 500 to 600 mV was produced while a steady current of approximately 3 mA continued for approximately 1.5 hours, after which the current flow decreased to zero over the next two hours.

Figure 2:
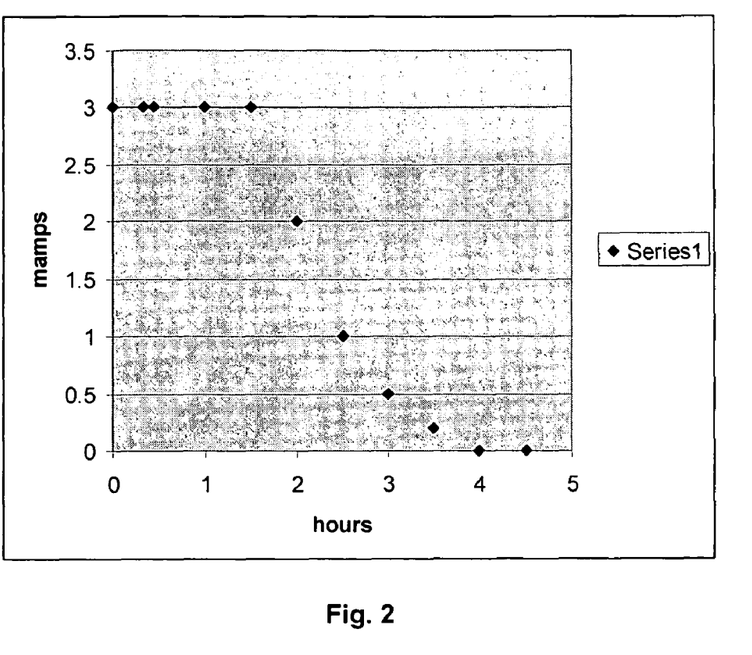
FIG. 2 is a graph depicting the amount of current from a fuel cell as a function of time from oxidizing glucose with a catalyst.

From the electrons initially available from glucose and from the integral of the current vs. time curve, 55% of the electrons present in glucose were converted to electrical energy in the experiment and represented in FIG. 2. The cell is not optimized for the MVo-glucose reaction studied here and it is likely the value of 55% is a lower limit and could be optimized with better design and equipment.

In other experiments a known amount of glucose was oxidized under controlled pH conditions at a MV/glucose ratio of 1.0 and produced 29% conversion efficiency (7.0 electrons/glucose). This result is in line with results conducted in the presence of $O_2$ at the same ratio.

Additional experiments using the fuel cell also showed that maximum current flow depends on the pH and buffer concentration and is maximized at about pH 12 and at about 0.25 M potassium phosphate, respectively. Long term fuel cell operation will require continual adjustment of pH to maintain maximal reaction conditions due to the large $OH^-$ requirement.

Additional Examples

Materials and Methods

The carbohydrates (sugars) and other compounds listed in Table 2, the potassium and sodium bicarbonate and phosphate buffer components, catalyst (e.g. methyl and benzyl viologen) and specifically labeled $^{13}C_1$ and $^{13}C_6$ glucose (99 atom percent) were purchased from Sigma. The other viologens were synthesized as reported in Hunig, S.; Gross, J.; Schenk, W. 1973, *Liebigs Ann. Chem.* 324-338, incorporated herein by reference. Care in handling the catalyst was undertaken because many of them are toxic substances. Milli Q water was used to make all solutions. All glassware was acid washed in 6 M sulfuric acid and rinsed extensively with milli Q water to remove metal ions and other potential catalytic species.

$O_2$-Uptake

Two $O_2$-uptake methods were used to evaluate catalytic oxidation of sugars during reactions catalyzed by the viologens in Table 2.

Continuous $O_2$-Uptake

A Micro Lab pressure sensor (Bozeman, Mont.) was connected to pressure-tight vessels of 2.0-10.0 mL nominal volume. Typically, 1.0-2.0 mL of buffer (0.20 to 0.50 M) was placed in the pressure cell under 1.0 atm of air and the desired viologen was added to 0.50-30.0 mM. An aluminum capped rubber septum sealed the cell and a glass tight syringe containing 10-100 uL of sugar solution (0.10-0.50 M) was put through the septum. When the cell and syringe assembly were equilibrated at 25-70° C., the fuel source (e.g. sugar) was added. The pressure change (in atmospheres) was monitored as a function of time (0.50-12 hours) and pressure-time files were collected using a computer. The pressure cell was calibrated (atm/mL) by recording successive pressure changes when 25-700 μL of gas was repeatedly removed and re-injected into the pressure cell at 1-5 min intervals. From this calibration and the change in pressure during the viologen-catalyzed sugar oxidation, the amount of $O_2$ consumed by the reaction was determined. Pressure changes for control reactions of buffer plus fuel source (e.g. sugar) or buffer plus viologen were determined and subtracted from the sugar-viologen reactions. Generally, these corrections for non specific fuel oxidation were <5% of the overall catalyzed reaction. However, this procedure overcorrects for the non-specific oxidation reaction because the fuel concentration decreases significantly as the catalyzed reaction proceeds, lowering the contribution of non-specific fuel oxidation.

Vial Method

To more efficiently investigate a wider range of conditions, reactions were conducted in 5.0-20 mL serum-capped pressure-tight glass vials. With this method, 5-20 individual reactions were conducted simultaneously by placing 1.0 mL of buffer plus the desired amounts of viologen and sugar in a vial at 23° C. under 1.0 atm of air along with a "flea" magnetic stir bar and immediately sealing the vial with an aluminum capped septum. The vial was vented, placed in a controlled temperature oven and rapidly stirred as the $O_2$-consuming reaction proceeded. When the reaction was completed, the vials were cooled to room temperature, weighed to ±0.1 mg, submerged in distilled water and the serum cap punctured with a 23 gauge needle to fill the vacuum created from the $O_2$-consumption with water. The vials were dried and reweighed. The increase in mass ($H_2O$, 0.9970 g/mL) gave the volume of $O_2$ taken up by the reaction. Typically 0.250-1.000 g of $H_2O$ was taken up, providing $O_2$-uptake accuracy of within 0.10%.

pH Variation

The vial method was used to conduct viologen-catalyzed sugar oxidation reactions in duplicate over a range of pH between 9.0 and 12.5. Both potassium and sodium phosphate and carbonate buffers were used at concetrations between 0.10 and 0.50 M.

The extent of fuel oxidation as measured by $O_2$-uptake by various viologens ranged from 20-80% depending on concentrations of fuel and catalyst as well as the pH and other conditions. The products of fuel oxidation were identified primarily by $^{13}$C-NMR (Bruker Ultrashield 300), using natural abundance glucose and specifically labeled $^{13}C_1$ and $^{13}C_6$ glucose. $H_2O_2$ was measured using peroxide test strips from EMD Chemicals Inc., Gibbstown N.J., sensitive to 0.5 mg/L. The presence of reducing sugars was determined by Benedicts Solution with a sensitivity of 1.0 μmol under the experimental conditions.

Anaerobic MV-Glucose Reaction

When $MV^{2+}$, glucose and buffer are mixed anaerobically at pH values between 11.0 and 12.5 at 45-60° C., the intensely blue color of reduced $MV^{1+}$ rapidly forms. In the absence of sugar, reduction of $MV^{2+}$ does not occur, establishing that a fuel (e.g. sugar) participates in MV reduction. The viologens identified in Table 2 were also effective in oxidizing glucose and other sugars.

Formation of $MV^{1+}$ was monitored during the anaerobic MV-glucose reaction at pH 11.0 and 50° C. A solution of 0.01 M glucose in 0.25 M phosphate buffer at pH 11.0 and increasing amounts of MV were added to examine different ratios of catalyst to glucose. When the reaction was complete, the vials were cooled and the resulting $MV^{1+}$ was titrated with 0.300 M $[Fe(CN)_6]^{3-}$.

TABLE 2

| Fuel | # C atoms | Catalyst MV | IPV | I | II |
|---|---|---|---|---|---|
| Glucose | 6 | 30-40 | 48 | 14 | 48 |
| Fructose | 6 | 42 | | | |
| Galactose | 6 | 35 | | | |
| Glucosamine | 6 | 43 | | | |
| Gluconic acid | 6 | 0 | | | |
| Ribose | 5 | 47 | 50 | 57 | 50 |
| Xylose | 5 | 45 | 52 | 25 | 52 |
| Erythrose | 4 | 48 | | | |
| Glyceraldehyde | 3 | 43 | 32 | 40 | 42 |
| Glyceric acid | 3 | 2 | | | |
| Dihydroxy acetone | 3 | 39 | | | |
| Hydroxy acetone | 3 | 40 | | | |
| Acetone | 3 | 0 | | | |
| Glycerol | 3 | 1 | | | |
| Maltose | 12 | 19 | 21 | 9 | 20 |
| Lactose | 12 | 22 | 19 | 6 | 20 |
| Sucrose | 12 | 0 | | | |
| Formaldehyde | 1 | 1 | | | |
| Formate | 1 | 1 | | | |
| Gluconic acid | 6 | 2 | | | |
| Methyl-α-D-glucopyranoside | 7 | 0 | | | |
| Sorbitol | 6 | 1 | | | |

The reactions identified in Table 2 were carried out by the vial method at 50° C. at a viologen/carbohydrate ratio of 1.0 at pH 11.0 in 0.50 M sodium phosphate buffer. $O_2$-uptake was measured to determine the extent of sugar oxidation. The numerical values are the % of the electrons present in the indicated compound that are transferred to $O_2$. IPV is isopropyl viologen, I and II are 1,1'-ethylene-2,2'-bipyridinium dichloride and 1',2,3,6-tetramethyl-2',4 bipyridinium diiodide respectively. Identical reactions were conducted with ethyl viologen with nearly identical results. Maltose, lactose, and sucrose are carbohydrates consisting of two hexoses connected by 1-4, glycosidic linkages but only the attached sugar with a free anomeric carbon undergoes oxidation.

The anaerobic reaction of glucose with excess MV occurred rapidly (minutes) under basic conditions with maximum reactivity for glucose occurring at pH values above 11. Viologen degradation becomes significant at pH>14, so a pH 11-14.0 was used for reaction with other hexoses. Glucose reduces 7-8 MV, even though 24 electrons are available from complete oxidation of glucose to $CO_3^{2-}$. In other experiments, values as high as 11 MV/glucose were measured but 7-8 MV was more typically observed. When the anaerobic reactions were exposed to air, $MV^+$ rapidly oxidized to $MV^{2+}$, but when made anaerobic and temperature equilibrated, $MV^+$ is formed again but less extensively. Repeated cycles show 12-15 of the 24 possible electrons in glucose are transferred to MV and subsequently to $O_2$. This step-wise process gives similar results to reactions continually exposed to $O_2$.

Pressure decrease measurements ($O_2$-uptake) for the reaction of 0.01 M glucose, 0.01 M MV and 0.25 M phosphate buffer at pH 11.0 and 50° C. were also conducted. A pressure change corresponding to 41.5% efficiency (10 electrons/glucose) of glucose oxidation was observed. The exponential pressure decay concluded at ~500 min, followed by a slower linear pressure decrease from 500 to 900 min and beyond.

Catalytic Aerobic Oxidation of Glucose

Pressure decreases were observed when glucose and MV in buffer reacted at 50° C. with air in the pressure cell, during which glucose was catalytically oxidized by $O_2$. An exponential pressure decrease ($O_2$-uptake) for ~500 min was observed followed by a slow linear pressure decrease for an extended period. The same two-phase behavior was noted in replicate reactions conducted at different temperatures and pH values. Similar results were obtained by the vial method. At concentrations of glucose below 0.5 mM, the reaction was very slow. At temperatures less than 40° C., no appreciable reaction occurred.

Glucose oxidation by $O_2$ using MV as catalyst at 50° C. at pH 11.0 in 0.25 M sodium phosphate buffer and one atmosphere of air was observed. In these experiments, glucose concentration was held at 0.010 M, and the MV concentration was varied to produce ratios ranging from 0.045 to 15.0. Results were also obtained by holding the MV concentration constant at 0.025 M and varying the glucose concentration to attain various ratios of MV to glucose. At a MV/glucose ratio near 1.0, only 41.5% of the reducing power of glucose was measured.

A series of reactions at pH 11.0 using the vial method at 50° C. were performed to examine the function of MV/glucose ratio. The efficiency of electron transfer of glucose electrons to $O_2$ by monitoring the amount of $O_2$ taken up by the reaction. The extent of glucose oxidation depends on the MV/glucose ratio and is ~35% at ratios of 0.10 to 2.0. Above this ratio, the efficiency (extent of glucose oxidation) slowly increases until at 12, ~80% efficiency is reached. At a ratio of 2.0 and ~35% efficiency, the MV catalyst cycles ~3 times but at 0.10, still at 35% efficiency, the catalyst makes >60 cycles. Under these conditions, no $H_2O_2$ was observed and $O_2$ was reduced to $H_2O$. At each MV/glucose ratio examined, the pH decreased less than 0.20 pH unit, demonstrating that the reaction was not pH limited. It was observed that the presence of metal ions functioning as catalysts can alter the extent of reaction. Precautions to minimize the amount of metal ions in solution may be beneficial.

pH Dependence

The efficiency of glucose oxidation as a function of pH was also examined. Reactions were conducted by the vial method in 0.25 M phosphate buffer at pH 11.0 at a MV/glucose ratio of 1.0 and at 50° C. Viologen-catalyzed oxidation of glucose by $O_2$ occurs at basic pH and has a pH plateau above 11. The same pH profile occurs with either sodium or potassium carbonate or phosphate buffers at concentrations from 0.10 to 0.5 M. Proton ionization from glucose may occur at a pKa near 10.6 because MV does not have ionizable protons. However, the pKa for glucose is ~12 but could be shifted downward to 10.6 if strong $MV^{2+}$ binding facilitates proton ionization.

At pH values above 14, catalyst degradation becomes more significant and may be manifest as formation of a yellow-brown solution. Degradation can be minimized by lowering the pH of the reaction mixture to <12 and maintaining the temperature below 60° C. The presence of $M^{2+}$ ions has the opposing effects of minimizing but not eliminating catalyst degradation but facilitating non-specific glucose oxidation.

Product Identification from Glucose Oxidation $^{13}C$ NMR spectra were obtained following glucose oxidation at a MV/glucose ratio of 12, giving ~80% (19 electrons/glucose) efficiency. Significant amounts of carbonate (168 ppm) and formate (171 ppm) and lesser amounts of gluconic acid (179 ppm) are seen, establishing that carbon-carbon bonds were broken and extensive oxidation of glucose occurred. Unreacted glucose (resonances between 60-80 ppm) or $^{13}C$ resonances of carbon atoms containing —OH groups in this region were barely detectable. A control spectrum of glucose and buffer (minus MV) in air under the same conditions did not produce carbonate and only trace amounts of formate, establishing that MV is required for glucose oxidation. $MV^{2+}$ resonances occur at 48, 126, 146 and 149 ppm.

Additional $^{13}C$ NMR spectra were obtained following reaction conducted at a MV/glucose ratio of 0.1 with an efficiency of 31% (7.4 electrons/glucose). The $^{13}C$ spectra showed significant amounts of formate, carbonate and gluconic acid (as well as glucose and non-glucose resonances, 60-96 ppm), establishing that under these conditions MV catalytically cycles numerous times and catalyzes significant carbon-carbon bond breaking. At MV/glucose ratios >2.0, more formate and carbonate are formed as glucose undergoes more extensive oxidation. However, carbonate does not increase as rapidly as formate, suggesting that formate becomes the primary product of glucose oxidation. This is supported by MV-formate reactions conducted under identical conditions, which show that only slight oxidation of formate to carbonate occurs (Table 2). Generally, both carbonate and formate are present in varying amounts but in some reactions carbonate is not observed and only formate was present.

$^{13}C$ NMR spectra were obtained after $^{13}C_1$-labeled glucose (92.3 and 96.4 ppm) was reacted at a MV/glucose ratio of 1.0 in air giving 30% efficiency (7.2 electrons/glucose). $^{13}C$-labeled formate was observed early in the reaction along with a much smaller resonance likely due to $^{13}C_1$ gluconic acid. When identical reactions were conducted with $^{13}C_6$-labeled glucose, weak resonances of $^{13}C$-labeled carbonate and stronger formate resonances were observed but in lesser amounts than the corresponding $^{13}C_1$-labeled reactions. Control reactions over 5.5 hours using $^{13}C$-labeled glucose without MV showed only the presence of unreacted glucose and a very weak formate resonance and no $^{13}C$-labeled carbonate. These labeling experiments and their controls establish that viologen catalyzes the oxidation of glucose by $O_2$ in air and that non-specific glucose oxidation is minimal. The results are consistent with oxidation beginning at the more reactive $C_1$ end of glucose and progressing to the $C_6$ end but do not exclude the possibility of simultaneous oxidation occurring at both ends.

Further reactions were conducted using the non-glucose fuels mentioned in Table 2. From these experiments it was observed that, in general, as long as the anomeric carbon atom is free, MV catalyzes oxidation.

Anaerobic Reduction of MV by Glyceraldehyde

Oxidative titration experiments of glyceraldehyde by MV conducted at pH 11.0 and 50° C. under anaerobic conditions. A solution of 0.010 M glyceraldehyde in 0.25 M phosphate buffer at pH 11.0 was and increasing amounts of MV were added to attain various ratios of glyceraldehyde and MV. When the reaction was complete, the vials were cooled and the resulting $MV^{1+}$ was titrated with 0.300 M $[Fe(CN)_6]^{3-}$.

A nearly identical curve was obtained when the experiment was conducted at 23° C. MV only removes ~4 of the potential 12 electrons in glyceraldehyde. As with glucose, this reaction seems to be thermodynamically limited because using benzyl viologen, which is a stronger oxidant (BV=−330 my vs. MV=−460 my), ~5.5 electrons are removed compared to ~4.0 with MV. The results establish that glyceraldehyde reacts more rapidly than glucose but less extensively.

Catalytic Aerobic Oxidation of Glyceraldehyde

Pressure-time curves for the MV-catalyzed $O_2$-oxidation of glyceraldehyde were obtained using 0.01 M glyceraldehyde, 0.04 M MV and 0.025 M phosphate buffer at pH 11.0 and 23° C. The pressure change corresponds to a 32.3% efficiency (3.9 electrons/glyceraldehyde) of glyceraldehyde oxidation. The near exponential pressure decrease changes to a near linear decrease from ~8 to 23 minutes. Another slower pressure decrease continues from 23 to 47 min and beyond. The change in reactivity at 8 to 23 minutes is reproducible in replicate reactions and likely results from a slower oxidation reaction of a glyceraldehyde oxidation product.

A decrease in O₂ pressure was observed over a period of only ~30 min at 23° C., in contrast to glucose, which requires ~6 hours at 50° C. Because of the greater reactivity of glyceraldehyde, reoxidation of $MV^{1+}$ is limited by $O_2$ transport from the gas to liquid phase. Even with vigorous stirring, $MV^{1+}$ is produced faster than it can be oxidized, thereby, initially imparting a dark blue color to the solution.

The efficiency of glyceraldehyde oxidation by $O_2$ using MV as catalyst at 50° C. at pH 11.0 in 0.25 M sodium phosphate buffer and one atmosphere of air was observed. The glyceraldehyde concentration was held constant at 0.020 M and the MV concentration was varied to produce ratios ranging from 1.0 to 20.0. Glyceraldehyde oxidation was observed to be dependent on the MV/glyceraldehyde ratio. At MV/glyceraldehyde ratios of 0.1 to 1.0 the efficiency is initially constant at ~40% but as the ratio increases to 10, ±80% oxidation of glyceraldehyde occurs. The reaction of glyceraldehyde is slightly more efficient at low MV/glyceraldehyde ratios and the efficiency increases slightly faster with MV/glyceraldehyde ratio than that with glucose.

The efficiency of glyceraldehyde oxidation as a function of pH was also examined. Reactions were conducted by the vial method in 0.25 M phosphate buffer at pH 11.0 at a MV/glyceraldehyde ratio of 1.0 at 50° C. The experiments were repeated at 23° C. producing similar results. For glyceraldehyde, the pH for maximum activity is about pH 9.5, in line with the greater ease of proton ionization from glyceraldehyde. The same behavior is seen in carbonate buffer. Glyceraldehyde was observed to undergo reaction about two pH units lower than glucose. Di- and mono-hydroxyl acetone (DHA and MHA, respectively) were also investigated and found to parallel this glyceraldehyde reactivity but were slightly more reactive. Tetroses and pentoses are intermediate in reactivity between glyceraldehyde and glucose and other hexoses in Table 2.

The invention claimed is:

1. A fuel cell comprising:
   (a) a positive electrode;
   (b) a negative electrode; and,
   (c) an electrolyte intervening between the positive electrode and the negative electrode, wherein the electrolyte is suspended in an aqueous medium having a pH greater than 9 and comprises:
      (i) an organic fuel containing a hydroxyl group; and,
      (ii) violene catalyst.

2. The fuel cell of claim 1, wherein the catalyst is a violene having the formula X—(CR═CR')ₙ—X'; where X and X' are independently selected from oxygen, sulfur, or nitrogen, each independently substituted with H, alkyl, alkylaryl, alkylthio, and alkylammonium; (CR═CR') is an aromatic group or a part of an aromatic group; n is an integer provided that aromaticity of (CR═CR') is maintained; and R and R' are each independently H or a bond.

3. The fuel cell of claim 2, wherein the organic fuel containing a hydroxyl group is a carbohydrate.

4. The fuel cell of claim 2, where in the organic fuel containing a hydroxyl group is an alcohol.

5. The fuel cell of claim 1, wherein the catalyst is a compound having the formula:

where $R^1$ is selected from the group consisting of alkyl, alkylaryl, alkylthio, and alkylammonium;
wherein the pyridinium ring may be optionally substituted with an electron withdrawing group or electron donating group.

6. The fuel cell of claim 1, wherein the catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl;
each $R^2$, $R^3$, $R^4$, $R^7$, $R^8$, $R^9$ is independently selected from the group consisting of H, alkyl, alkylaryl, alkylthio, alkylammonium, an electron donating group, and an electron withdrawing group;
each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl;
each $A^-$ is independently an anion;
each $Y^1$, $Y^2$, $Y^3$, $Y^4$, $Y^5$, $Y^6$, $Y^7$, $Y^8$, $Y^9$, and $Y^{10}$ are independently C or N, wherein at least one of $Y^1$, $Y^2$, $Y^3$, $Y^4$, $Y^5$, $Y^6$, $Y^7$, $Y^8$, $Y^9$, and $Y^{10}$ is N and the R group geminal to N is selected from the group consisting of alkyl, alkylaryl, alkylthio, and alkylammonium.

7. The fuel cell of claim 1, wherein the pH is greater than 10.

8. A composition for use as an energy source in a fuel cell, comprising:
   (a) an organic fuel containing a hydroxyl group; and,
   (b) a violene catalyst;
   wherein the composition is suspended in an aqueous medium having a pH greater than 9.

9. The composition for use as an energy source in a fuel cell of claim 8, wherein the catalyst is a violene having the formula X—(CR═CR')ₙ—X'; where X and X' are independently selected from oxygen, sulfur, or nitrogen, each independently substituted with H, alkyl, alkylaryl, alkylthio, and alkylammonium; (CR═CR') is an aromatic group or a part of an aromatic group; n is an integer provided that aromaticity of (CR═CR') is maintained; and R and R' are each independently H or a bond.

10. The composition for use as an energy source in a fuel cell of claim 9, wherein the organic fuel containing a hydroxyl group is a carbohydrate.

11. The composition for use as an energy source in a fuel cell of claim 9, where in the organic fuel containing a hydroxyl group is an alcohol.

12. The composition for use as an energy source in a fuel cell of claim 8, wherein the catalyst is a compound having the formula:

where $R^1$ is selected from the group consisting of alkyl, alkylaryl, alkylthio, and alkylammonium;
wherein the pyridinium ring may be optionally substituted with an electron withdrawing group or electron donating group.

13. The composition for use as an energy source in a fuel cell of claim 8, wherein the catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl;
each $R^2, R^3, R^4, R^7, R^8, R^9$ is independently selected from the group consisting of H, alkyl, alkylaryl, alkylthio, alkylammonium, an electron donating group, and an electron withdrawing group;
each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl;
each $A^-$ is independently an anion;
each $Y^1, Y^2, Y^3, Y^4, Y^5, Y^6, Y^7, Y^8, Y^9$, and $Y^{10}$ are independently C or N, wherein at least one of $Y^1, Y^2, Y^3, Y^4, Y^5, Y^6, Y^7, Y^8, Y^9$, and $Y^{10}$ is N and the R group geminal to N is selected from the group consisting of alkyl, alkylaryl, alkylthio, and alkylammonium.

14. The composition of claim 8, wherein the pH is greater than 10.

15. A method for generating electric power, comprising:
(a) providing a positive electrode;
(b) providing a negative electrode;
(c) providing an electrolyte intervening between the positive electrode and the negative electrode, wherein the electrolyte is suspended in an aqueous medium having a pH greater than 9 and comprises an organic fuel containing a hydroxyl group and a violene catalysts; and,
(d) contacting the positive electrode and the negative electrode with a conductor.

16. The method of claim 15, wherein the catalyst is a violene having the formula X—(CR=CR')$_n$—X'; where X and X' are independently selected from oxygen, sulfur, or nitrogen, each independently substituted with H, alkyl, alkylaryl, alkylthio, and alkylammonium; (CR=CR') is an aromatic group or a part of an aromatic group; n is an integer provided that aromaticity of (CR=CR') is maintained; and R and R' are each independently H or a bond.

17. The method of claim 16, wherein the organic fuel containing a hydroxyl group is a carbohydrate.

18. The method of claim 16, where in the organic fuel containing a hydroxyl group is an alcohol.

19. The method of claim 15, wherein the catalyst is a compound having the formula:

where $R^1$ is selected from the group consisting of alkyl, alkylaryl, alkylthio, and alkylammonium;
wherein the pyridinium ring may be optionally substituted with an electron withdrawing group or electron donating group.

20. The method of claim 15, wherein the catalyst is a compound having the formula:

where $R^1$ and $R^{10}$ are independently selected from the group consisting of H, alkyl, alkylaryl, alkylthio, alkylammonium, an electron donating group, and an electron withdrawing group, or together $R^1$ and $R^{10}$ are selected from the group consisting of ethyl, propyl, and ethenyl;
each $R^2, R^3, R^4, R^7, R^8, R^9$ is independently selected from the group consisting of H, alkyl, alkylaryl, alkylthio, alkylammonium, an electron donating group, and an electron withdrawing group;
each $R^5$ and $R^6$ is independently selected from the group consisting of H, alkyl, alkylaryl, alkylthio, alkylammonium, an electron donating group, and an electron withdrawing group, or together $R^5$ and $R^6$ are selected from the group consisting of ethyl, propyl, and ethenyl;
each $A^-$ is independently an anion;
each $Y^1, Y^2, Y^3, Y^4, Y^5, Y^6, Y^7, Y^8, Y^9$, and $Y^{10}$ are independently C or N, wherein at least one of $Y^1, Y^2, Y^3, Y^4, Y^5, Y^6, Y^7, Y^8, Y^9$, and $Y^{10}$ is N and the R group geminal to N is selected from the group consisting of alkyl, alkylaryl, alkylthio, and alkylammonium.

21. The method of claim 15, wherein the pH is greater than 10.

* * * * *